United States Patent
Yamada et al.

(10) Patent No.: US 7,243,119 B1
(45) Date of Patent: Jul. 10, 2007

(54) FLOATING POINT COMPUTING UNIT

(75) Inventors: Tetsuya Yamada, Kodaira (JP); Motonobu Tonomura, Kodaira (JP); Fumio Arakawa, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 628 days.

(21) Appl. No.: 10/362,775

(22) PCT Filed: Sep. 26, 2000

(86) PCT No.: PCT/JP00/06612

§ 371 (c)(1), (2), (4) Date: Jun. 19, 2003

(87) PCT Pub. No.: WO02/29546

PCT Pub. Date: Apr. 11, 2002

(51) Int. Cl.
*G06F 7/52* (2006.01)

(52) U.S. Cl. .................. 708/650
(58) Field of Classification Search ........ 708/650, 708/605
See application file for complete search history.

(56) References Cited

U.S. PATENT DOCUMENTS

| | | | | |
|---|---|---|---|---|
| 5,386,376 A | * | 1/1995 | Girard et al. | 708/656 |
| 5,467,299 A | * | 11/1995 | Sato et al. | 708/650 |
| 5,787,030 A | * | 7/1998 | Prabhu et al. | 708/650 |
| 6,549,926 B1 | * | 4/2003 | Kalambur et al. | 708/650 |

FOREIGN PATENT DOCUMENTS

| | | | | |
|---|---|---|---|---|
| JP | 03166623 A | * | 7/1991 | |
| JP | 4-172526 | | 6/1992 | |
| JP | 6-290030 | | 10/1994 | |
| JP | 9-69040 | | 3/1997 | |
| JP | 9-91270 | | 4/1997 | |
| JP | 10-187420 | | 7/1998 | |

* cited by examiner

*Primary Examiner*—Tan V. Mai
(74) *Attorney, Agent, or Firm*—Mattingly, Stanger, Malur & Brundidge, P.C.

(57) ABSTRACT

A Sweeney Robertson Tocher (SRT) divider and a square root extractor of floating point double-precision bit width, including a selector of single-precision and double-precision, a carry propagation adder (CPA) for conducting carry propagation of a partial remainder, a quotient digit selector circuit for making selection on a quotient digit, and a selector of a divisor or a partial square root extractor circuit, in a lower side thereof. A selector for selecting the propagation of carry between a carry save adder (CSA) in the upper side and the lower side thereof is provided, and a selector of a starting position within a quotient production circuit is provided, thereby enabling the execution of two (2) calculations, such as, division or square root extraction of the floating point single-precision, at the same time, but without increasing the bit width of a computing unit. Also, with the square root extraction, it is possible to execute two (2) calculations of single-precision in parallel, in a similar manner, by adding a partial square root extraction circuit thereinto.

6 Claims, 11 Drawing Sheets

FIG. 3
(a) ALGORITHM OF QUOTIENT PRODUCTION CIRCUIT
| $q_{i+1}$ | |
|---|---|
| +1 | $M_i = M_{i-1} + 2^{-i}$<br>$N_i = N_{i-1}$ |
| 0 | $M_i = M_{i-1}$<br>$N_i = N_{i-1} + 2^{-i}$ |
| −1 | $M_i = N_{i-1} + 2^{-i}$<br>$N_i = N_{i-1}$ |
$M_i$: positive
$N_i$: negative
$P_i$: position
$q_i$: QUOTIENT DIGIT
$Q_i$: QUOTIENT
$M_i = Q_i$
$N_i = Q_i - 2^{-i}$
$P_i = 2^{-i}$
(b) Position $P_i$
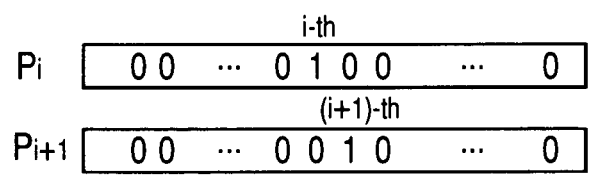
(c) STRUCTURE OF QUOTIENT PRODUCTION CIRCUIT
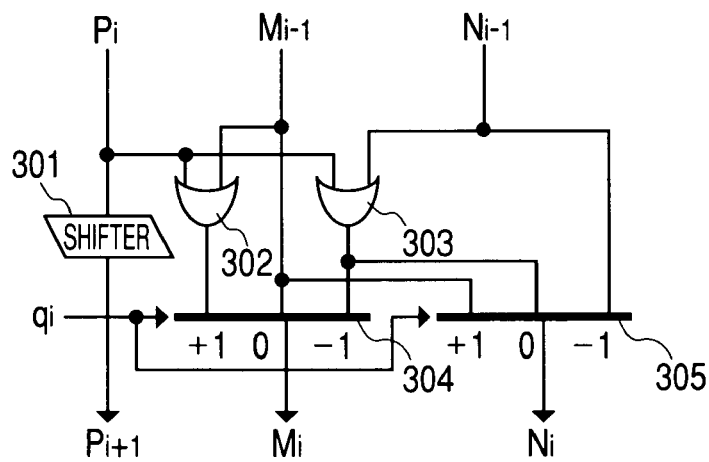

FIG. 7

PARTIAL SQUARE ROOT CIRCUIT

(1) DIVISION

| $q_i$ | |
|---|---|
| +1 | $R_{i+1} = 2(R_i - D)$ |
| 0 | $R_{i+1} = 2R_i$ |
| −1 | $R_{i+1} = 2(R_i + D)$ |

(2) SQUARE ROOT

| $q_{i+1}$ | |
|---|---|
| +1 | $R_{i+1} = 2(R_i - Q_i - 2^{-(i+2)}) = 2(R_i - (M_i + 2^{-(i+2)}))$ |
| 0 | $R_{i+1} = 2R_i$ |
| −1 | $R_{i+1} = 2(R_i + Q_i - 2^{-(i+2)}) = 2(R_i + (N_i + 2^{-(i+1)} + 2^{-(i+2)}))$ |

SELECT:
WHEN $q_{i+1} = 1$  DIVISION $\overline{D}$  SQUARE ROOT $\overline{M_i + 2^{-(i+2)}}$
WHEN $q_{i+1} = 0$  DIVISION 0  SQUARE ROOT 0
WHEN $q_{i+1} = -1$  DIVISION D  SQUARE ROOT $N_i + 2^{-(i+1)} + 2^{-(i+2)}$

FLOATING POINT COMPUTING UNIT

TECHNICAL FIELD

The present invention relates to a computing unit, and in particular, to a floating point computing unit, using a SRT method having bit width of double-precision, and also to an electronic circuit device using it therein.

BACKGROUND ART

In general, the calculation or computing, such as, division is carried out in a repetitive type; in the similar manner to that with using figures written down on paper on a desk. The division of such the repetitive type of calculation can be divided in the types thereof, roughly into three (3); such as, a pull-back method, a pull-away method, and a SRT method, for example. Though being common with upon the principle of calculations, however those methods are fit to the high-speed calculation, in such the order as was mentioned above, due to use of redundancy of the quotient digit. Further, there is a convergence method other than those, however explanation will be omitted herein.

First, explanation will be given in the pull-back method. Assuming a dividend to be a partial remainder, a divisor is subtracted from the partial remainder, and if the result is a positive or zero (0), the quotient digit is made to be "1". And, if being negative, the quotient digit is made to "0", thereby turning back to an original value by adding the divisor subtracted again (this is so-called the "pull-back"). A left-hand side shifting is made to double the partial remainder (i.e., two (2) times), and then the next quotient digit is obtained, and this is repeated thereafter. Ten (10) times on the calculation with figure on paper corresponds to two (2) times of the 1 bit left-hand side shifting. In this pull-back method, since it is always necessary to add the divisor, so as to pull back, therefore if the partial remainder is negative, there is a limit on the high-speed division calculation.

On the contrary to this, it is the pull-away method, in which a negative value is provided for the quotient digit, such as, "–1" or "1", for example, thereby eliminating the correction by the pull-back of the partial remainder. Since the quotient digit includes "–1", there is a necessity of providing a quotient producing circuit for producing the quotient of only "0" or "1". With this pull-away method, the quotient digit must be determined upon a result of subtraction of the partial remainder and the divisor, similar to the pull-back method mentioned above, therefore the high-speed processing is also difficult when the partial remainder and the divisor are large in the bit widths thereof. This pull-away method is described, for example, in Japanese Patent Laying-Open No. Hei 4-172526 (1992) "FLOATING POINT DIVIDER", which will be mentioned later.

While, the SRT method is one, in which "–1", "0" or "–1" is taken to be the quotient digit, so as to normalize the divisor and the dividend, thereby enabling the determination of the quotient digit at high-speed with using a several upper bits of the partial remainder. The calculation method by using this SRT method is described, for example, in Japanese Patent Laying-Open No. Hei 6-290030 (1994) "DIVIDER APPARATUS", Japanese Patent Laying-Open No. Hei 9-69040 (1997) "CIRCUIT FOR CONDUCTING SQUARE ROOT CALCULATION/DIVISION OF RADIX 2 BY 3 STAGE OVERLAPPING WITH, EACH HAVING INTERFERENTIAL CALCULATION", Japanese Patent Laying-Open No. Hei 9-91270 (1997) "COMPUTING UNIT", and Japanese Patent Laying-Open No. Hei 10-187420 (1998) "DIVISION/SQUARE ROOT EXTRACTION COMPUTING UNIT" by the present inventors, etc.

On the other hand, as a method for duplicating the performance of a single precision calculation, by enabling the single precision calculation in the lower bits of the computing or calculating unit having double precision bit width, which is not used, there is also disclosed a computing unit, in which a small-scaled circuit is added to the floating point divider of the double precision, as shown in the Japanese Patent Laying-Open No. Hei 4-172526 (1992) relating to the pull-back method mentioned above, thereby processing two (2) floating point divisions of the single precision, in parallel. The adding/subtracting computing unit is divided into an upper one and a lower one, for conducting the respective single precision calculation therewith. Also, with the partial remainder, selection is made on whether to be added or subtracted with respect to the divisor, depending on the respective signs at the upper and the lower thereof. When being under the double precision, it is so constructed that a result can be obtained, which is same to that obtained by means of the computing unit of the double precision width, by selecting the sign at the upper side and also at the lower side, and transferring carrier from the lower side to the upper side.

Though this Japanese Patent Laying-Open No. Hei 4-172526 (1992) discloses therein the floating point dividing apparatus, being very effective for conducting the single precision calculations in parallel, but there is still an aspect in the calculating method, to be further improved with.

Namely, the pull-away method is applied into the calculation of the partial remainder from a viewpoint of the circuit structure, and the positive or negative of the partial remainder is determined upon the sign of the partial remainder, thereby determining on whether addition or subtraction is made with the divisor. However, upon determining on the positive/negative of the partial remainder by means of the sign of the partial remainder, it is necessary to propagate the partial remainder, with carrying up all the bits thereof, and then it takes much time for processing, therefore it has a drawback that it is difficult to process it at high-speed. Further, in this Japanese Patent Laying-Open No. Hei 4-172526 (1992), no disclosure is made on a manner or method for executing the calculation for extracting the square root at the high-speed.

An object, according to the present invention, is to provide a high-speed computing unit, such as, a divider, a square root unit, and also to provide an electronic circuit device using thereof.

The object in more details thereof, according to the present invention, is to provide a high-speed computing unit, enabling single-precision one (1) calculation, single precision two (2) calculations, and double precis ion calculation therewith, and also to provide an electronic circuit device using thereof.

Further the object, in more details thereof, according to the present invention, is to provide a computing unit, such as, a SRT computing unit of high-precision and high-speed, in particular, a floating point divider and a square root computing unit, etc., with using the SRT method having the double precision bit width, and also to provide an electronic circuit device using thereof.

DISCLOSURE OF THE INVENTION

Before explaining about the high-speed floating point divider and the square root unit having the double precision bit width, explanation will be given, on the algorithm of the SRT method according to the present invention, herein a little bit.

On the SRT divider, calculation is proceeded with conducting a loop, repeatedly: i.e., selecting the quotient digit from the upper digit bits of the partial remainder, so as to subtract the divisor from the partial remainder in accordance with the quotient digit selected, and thereby obtaining a new partial remainder.

Next, explaining the SRT dividing method with paying attention onto the function of a provisional-number loop portion for the SRT division and the structure thereof, uniquely by the present inventors, for easy understanding thereof, it can be expressed as shown in FIG. 2.

First, the dividend X is put into the partial remainder. Assuming that the number of times of repetitions of the loops is expressed by a step number, then the partial remainder at $i^{th}$ step can be expressed by a form of the carry save, and it is also assumed that "sum" and "carry" are written by $PRS_i$ and $PRC_i$, respectively. On the upper digits of the partial remainder is conducted the carry propagation in a Carry Propagation Adder (CPA) 201. With using this carry-propagated partial remainder as an input, the quotient digit is selected by means of a quotient digit selector circuit 202. The quotient digit is one of "−1", "0" and "1", and on the partial remainder is made the partial remainder calculation with the divisor, depending upon the value of the selected quotient digit. The calculation of this partial remainder is executed within a Carry Save Adder (CSA) 205, and in the form of carry save. With the partial remainder, it is enough to make the carry propagation only on a several upper bits for selection of the quotient digit, therefore the lower bits are in the form of carry save for high-speed processing. When the quotient digit is "−1" or "1", addition and subtraction are made between the partial remainder and the divisor D, for each, and the result thereof is shifted to the left by one (1) bit by means of a shifter 206, thereby producing the next partial remainders $PRS_{i+1}$ and $PRC_{i+1}$, respectively. Or, when the quotient digit is "0", addition is made between the partial remainder and "0", and the result is shifted to the left by the one (1) bit, thereby producing the partial remainder for the next step. While repeating the operation mentioned above, a conversion into a quotient, not including the quotient value "−1" therein, i.e., the calculation of quotient is conducted within a quotient production circuit 203, in parallel with, thereby obtaining the quotient through outputting the quotient "Q".

Also, with the square root extraction, the calculation of partial remainder is conducted with using a partial square root value in the place of the divisor "D". A SRT square root circuit can be used in common with a SRT divider circuit, if adding a circuit for obtaining the partial square root value thereto. However, herein the square root value digit is called by the quotient digit, which is obtained by the quotient digit selector circuit 202 for the square root extraction, in the same manner to the division.

Herein, with provision of the carry save adder CSA 205 and the quotient production circuit 203, each having the double precision bit width, the calculation can be made by both the single precision and the double precision. With the division and the square root extraction of the single precision, it can be achieved by turning all of the lower bits of the quotient production circuit into "0".

The above-mentioned is the basic or fundamental algorithm of the SRT method, which is used in the present invention.

The present invention is made first, by understanding algorithm of the SRT, which is widely used in high-speed dividers, to be a method; i.e., without conduction carry propagation on all bits of the partial remainder, but the carry propagation is conducted only on the bit width (ordinarily, 3 to 4 bits) being necessary at the minimum for decision on addition/subtraction by the divisor, while the remaining bits are calculated in the form of carry save for the purpose of high-speed, as was mentioned above, and thereby providing a SRT division computing unit and/or a SRT square root computing unit, enabling the single precision calculation of a computing unit of double precision bit width, and also parallel execution of two (2) commands of the single precision with the double precision width.

The following is the explanation about an outline of the representative one of the present inventions, which are disclosed in the present application.

A computing unit, according to the present invention, comprises: an input portion, into which a dividend or partial remainder thereof and a divisor is inputted; a selector for selecting between an upper side and a lower side of said dividend or said partial remainder; a carry propagation means (CPA) for conduction carry propagation on said dividend or said partial remainder at the upper side or the lower side, selected; a quotient digit selection means for inputting an output of said carry propagation means; a quotient production means, inputting said quotient digit, for producing a quotient; and a carry save adder means (CSA) for conducting addition/subtraction between said dividend or said partial remainder and said divisor depending upon a value of the quotient digit, which is obtained by said quotient digit selection means, wherein an output of said carry save adder means is shifted by predetermined bits, to be inputted into said input portion, as a new dividend and remainder, again, and this series of operations are conducted, repeatedly, thereby executing a desired calculation.

A square root computing unit, according to the present invention, for calculating out a square root value of a dividend, comprises: an input portion, into which a dividend or partial remainder thereof and a divisor is inputted; a selector for selecting between an upper side and a lower side of said dividend or said partial remainder; a carry propagation means for conduction carry propagation on said dividend or said partial remainder at the upper side or the lower side, selected; a quotient digit selection means for inputting an output of said carry propagation means; a quotient production means, inputting said quotient digit, for producing a square root value; a partial square root value production means, inputting said quotient digit, for producing a partial square root value; and a carry save adder means for conducting addition/subtraction between said dividend or said partial square root value and said divisor depending upon a value of the quotient digit, which is obtained by said quotient digit selection means, so as to conduct the carry save on a result thereof, wherein an output of said carry save adder means is shifted by predetermined bits, to be inputted into said input portion, as a new dividend and remainder, again, and this series of operations are conducted, repeatedly, thereby calculating out the square root value of said dividend.

Further, in a divider unit, according to the present invention, in a SRT divider, for carrying out calculation, by selecting a first quotient digit from upper digits of a partial remainder, subtracting a divisor from said partial remainder corresponding to said upper digits, in accordance with said first quotient digit selected, while repeating a loop for obtaining a new first partial remainder, wherein a function is added for obtaining a new second partial remainder, by selecting a second quotient digit from said upper digits or lower digits, separating from said first quotient digit, in accordance with said second quotient digit selected, wherein a double precision calculation, a single precision calculation, and single precision plural parallel calculations are executable by calculation of repeating said loop while merging said second partial remainder obtained with said first partial remainder.

And also, according to the present invention, since it is possible to obtain a high-speed computing unit with the substantially same circuit construction, which is able to carry out the division and/or the square root extraction under the single precision 1 calculation, the single precision 2 calculations and/or the double precision calculation, therefore it is suitable for high integration of an electronic circuit system onto one (1) pieces of a semiconductor substrate. With such the electronic circuit device, it is necessary for a user to designate the operation mode of said computing unit freely, and therefore, a microprocessor, for example, comprises: an instruction cache and a data cache; a CPU and a floating point computing unit, being connected with said instruction cache and said data cache through data bus, wherein said floating point computing unit comprises a load store unit, a register file, a sum of products calculator, and a divider, being executable under plural operation modes, including a double precision calculation, a signal precision calculation, and single precision plural parallel calculations, and said register file has a floating point calculation status register, with which simultaneous execution of the double precision calculation and the single precision plural parallel calculations are inhibited, so that a user can designate said operation mode of said computing unit from an outside, thereby setting the operation mode of said divider.

BRIEF DESCRIPTION OF THE DRAWINGS

FIG. 3 shows an algorithm for explaining about a quotient production circuit in the first embodiment, according to the present invention, and also a view of the circuit structure thereof;

FIG. 7 shows an algorithm for explaining the operation in the third embodiment;

BEST MODE FOR CARRYING OUT THE INVENTION

Figure 1:
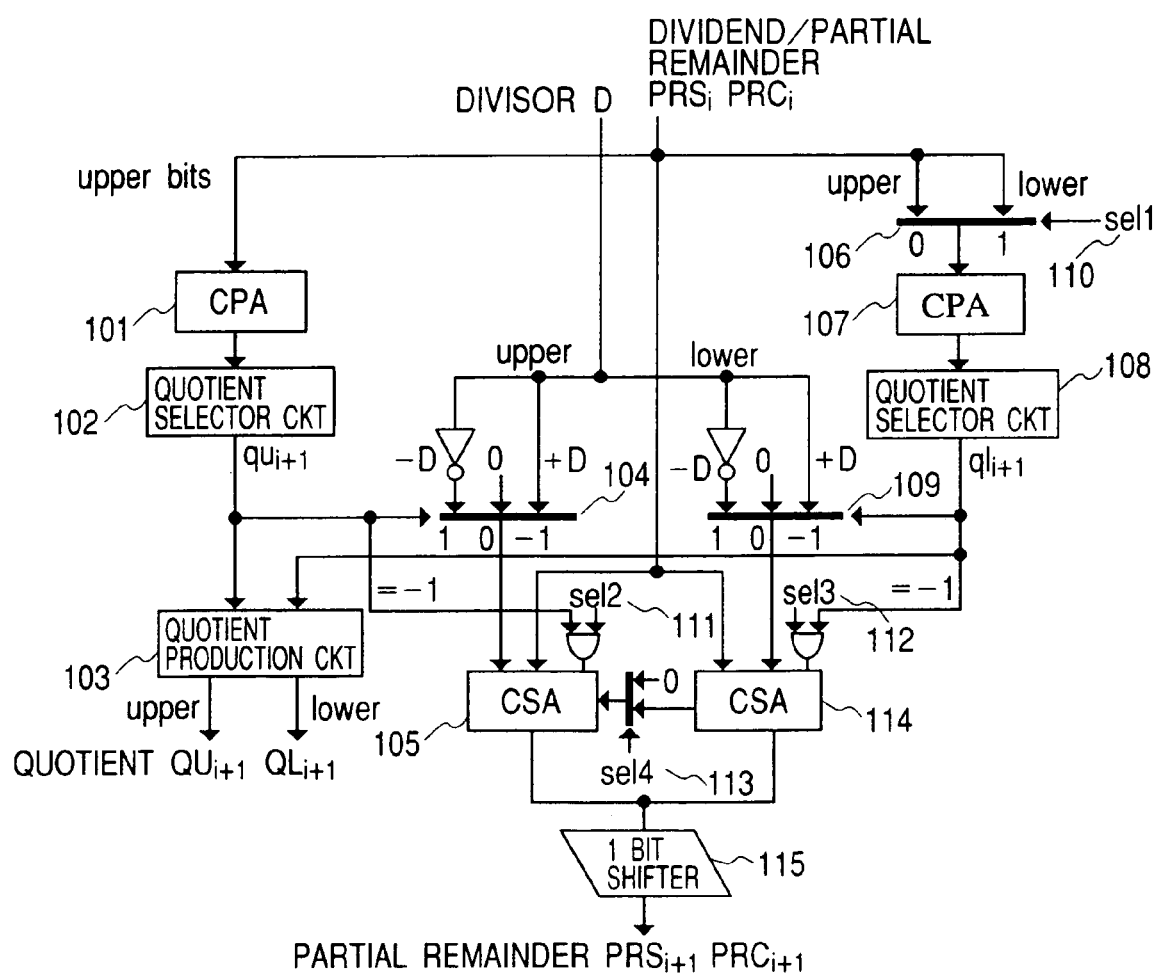
FIG. 1 is a circuit system structure view for explaining a first embodiment, according to the present invention.

According to the present invention, the data is assumed to be the floating point data, and the operation is made in accordance with the SRT division algorithm and/or an algorithm of the SRT square root extraction, which will be mentioned below, in particular, relating to the calculation of a provisional number portion thereof.

The partial remainder of the division and the square root extraction can be expressed by the following equations. The square root extraction can be made to the calculation, being similar to the division, by replacing the divisor "D" in the division with the partial square root value, i.e., $Q_i+q_{i+1} \times 2^{-(i+2)}$, thereby enabling common use of the circuit. The partial square root value of the square root extraction corresponds to the divisor "D" of the division, and it is treated by separating from the square root value $Q_i$. In the following equation, "×2" multiplication is carried out by the left 1 bit shift.

Division: $R_{i+1}=2(R_i-q_i D)$

Square root extraction: $R_{i+1}=2\{R_i-q_{i+1}(Q_i+q_{i+1}2^{-(i+2)})\}$

Quotient or square root value: $Q=q_0.q_1q_2q_3q_4 \ldots q_i$

However, where "$q_i$" means the quotient digit (−1, 0, 1), "$R_i$" the partial remainder, "D" the divisor, "$q_{i+1}2^{-(i+2)}$" the partial square root value, and "$Q_i$" the quotient or the square root value, in $i^{th}$ step, respectively.

With the SRT method, the quotient digit is selected from a several number of the upper digits. Accordance to the equation mentioned above, the partial remainder and the quotient digit are obtained in each step. When completion of all the steps, the quotient or the square root value (hereinafter, may be described by quotient/square root value) can be obtained.

Since the quotient digit includes "−1" therein, there is necessity to convert the quotient, the square root value and the partial square root value into the number, not including "−1" therein; i.e., only "0" or "1" (thus, converting the redundant quotient digit into the quotient or the square root value of the non-redundant quotient digit), however it is converted through "On-the-Fly" within the quotient production circuit every time when the quotient is obtained, but not converting it after completion of the calculation thereof. This "On-the-Fly" conversion is a method, as is described in Japanese Patent Laying-Open No. Hei 10-187420 (1998), in which the conversion is made, but without making carry propagating on the quotient digit "−1" while maintaining the binary expression of "$Q_i$" and "$Q_i-2^{-i}$ (negative)".

However, the square root extraction differs from the division with using the divisor, in an aspect that the partial remainder is obtained with using the partial square root value converted through the "On-the-Fly" within the partial square root extraction circuit.

An initial value is $R_0=X$ (dividend or an extracted value by square root), $q_0=1$ (divisor), $q_0=0$, and $q_1=1$ (square root), when i=0. In the division, the dividend "X" and the divisor "D" are normalized, such as, [½, 1) and [½, 1), respectively. In the square root extraction, it is assumed the extracted value X of square root is [¼, 1). The square root value is adjusted by conducting the 1 bit right shift on the provisional portion, so that an exponential portion comes to be an even number. However, [½,1) is a mark expression of indicating to be equal to or greater than ½ and less than 1, and it is also same to others.

Figure 2:
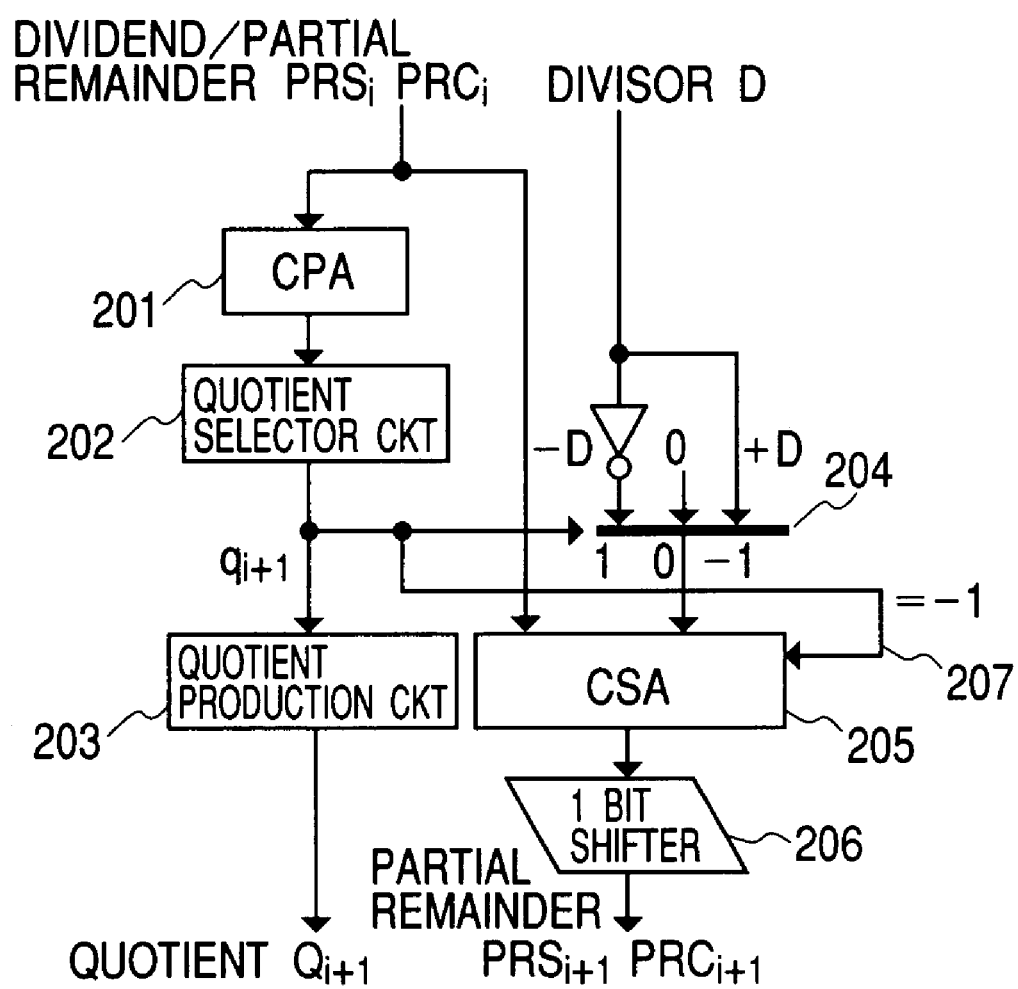
FIG. 2 is a circuit system structure view for explaining an algorithm of the SRT division used in the present invention.

FIG. 2 shows the SRT division in $i^{th}$ step. Assuming that "sum" and "carry" of the partial reminder are $PRS_i$ and $PRC_i$, respectively, in the $i^{th}$ step, inputting the upper digits of the partial reminder, which is conducted with the carry propagation within the carry propagation means CPA 201, selecting the quotient digit $q_{i+1}$ within the quotient selection circuit 202, selecting the divisor +D, 0, –D within the divisor selector 204 by means of the quotient selected, conducting the addition and/or subtraction between the selected divisor and the partial reminder in the carry save adder means CSA 205, making the left 1 bit shift in the 1 bit shifter 206, and thereafter $PRS_{i+1}$ and $PRC_{i+1}$ are obtained as the result. A carry input signal 207 of the carry save adder means CSA is one, which comes to be "1" when the quotient digit $q_{i+1}=1$. At the same time, within the quotient production circuit 203 is obtained the quotient $Q_{i+1}$, not including "–1" of the quotient digit therein. Irrespective of the single-precision or the double-precision of the input data, the carry propagation adder CPA for the upper digits and the quotient digit selector circuit are common, and therefore the double-precision calculation can be obtained if the carry save adder means CSA and the quotient production circuit are the computing units of the double-precision bit width. However, when carrying out the single-precision calculation by means of the computing unit of the double-precision bit width, "0" is inputted into the lower bits of the carry save adder means CSA and the quotient production circuit, however it cannot be said that the computing unit is used effectively.

EMBODIMENT 1

Then, a first embodiment according to the present invention is shown in FIG. 1, which has a function of executing the single-precision division at the high-speed and in parallel, in the upper and the lower of the computing unit of the double-precision bit width, under the SRT method.

The upper side of the computing unit of the double-precision bit width is called "upper", while the lower side thereof is called "lower" for convenience. The carry propagation means CPA 101 for use of the upper digits of the partial remainder in the lower side, the quotient digit selector circuit 108, and the divisor selector 109 are provided additionally, in FIG. 2. Within the data selectors 106 in the upper and the lower sides, the upper side is selected for the single-precision 1 calculation and the double-precision calculation, in the selection signal sel 1 (110), while the lower side is selected for parallel execution of the single-precision 2 calculations.

The calculation method of the double-precision, which is executed in FIG. 1, according to the present invention, is as follows.

The upper side is selected within the data selectors 106 in the upper and the lower sides, and to the carry propagation means CPA 107 is given the same partial remainder to the carry propagation means CPA 101, therefore the same quotient digit is selected from the two (2) quotient digit selector circuits 102 and 108. In accordance with the quotient digit, the divisor is selected within the divisor selector 104 and 109, and the addition and the subtraction with the partial remainder is conducted within the carry save adder means CSA 105 and 114.

Since an upper side carry input signal 111 is the carry input for the single-precision calculation of the upper side, it is turned to be non-effective when the double-precision calculation is conducted. Since a lower side carry input signal 112 is the carry input for the single-precision calculation of the lower side or the double-precision calculation, then the lower side carry input signal comes to be effective, so as to make the subtraction between the partial remainder and the divisor when q=–1, and the carry is inputted. For conducting propagation of the carry between the carry save adder means CSA 105 in the upper side and the carry save adder means CSA 114 in the lower side, the carry selector 113 selects the carry output of the carry save adder means CSA 114 in the lower side.

The partial remainder of the calculation result is shifted to the left by 1 bit (the left 1 bit shift) within the 1 bit shifter 115, thereby obtaining the following partial remainders $PRS_{i+1}$ and $PRC_{i+1}$.

In this manner, the same quotient digit is selected under the double-precision, and though the load thereof is large, since the said quotient digit selects the divisor of the double-precision width, the drive capacity (power) thereof can be enhanced, by making the quotient selector circuits into two (2), thereby obtaining an advantage that the high-speed circuit can be achieved.

Also, in the case of conducting the single-precision 1 calculation with the structure shown in FIG. 1, the calculation can be done with the method being similar to that mentioned above, but except that the remaining bits of the double-precision width are set to "0" when putting the dividend to the initial partial remainder. As others than that, the calculation can be made with a method, in which "0" side is selected within the selector sel4 (113), which controls the carry propagation of the carry save adder by giving the upper side carry input 111 in the place of the carry input of the double-precision. In both of the cases, the data selectors in the upper and lower sides select the upper side.

Next, explanation will be made on the method of carrying out two (2) calculations in parallel of the single-precision with the structure shown in FIG. 1.

Since the lower side is selected within the data selectors 106 in the upper and lower sides, the quotient digits of the upper side $qu_{i+1}$ and the lower side $ql_{i+1}$ are selected from the quotient digit selector circuits 102 and 108, respectively. The divisors are selected in the divisor selector 104 and 109 in accordance with the quotient digits, and the addition and the subtraction with the partial remainder are carried out within the carry save adder means CSA 105 and 114.

Since the upper side carry input signal 111 is the carry signal of the single-precision calculation in the upper side, the upper side carry input signal turns to be effective for carrying out the subtraction between the partial remainder and the divisor when the upper side quotient digit $qu_{i+1}=-1$.

The lower side carry input signal 112 turns to be effective for carrying out the subtraction between the partial remainder and the divisor when the quotient digit $ql_{i+1}=-1$, thereby the carry is inputted. Since no propagation of carry is conducted between the upper side carry save adder means CSA 105 and the lower side carry save adder means CSA 114, the carry selector 113 selects "0", to be the carry input into the upper carry save adder means CSA 105.

The left 1 bit shift is made on the partial remainder of the calculation result in the 1 bit shifter 115, thereby obtaining the partial remainders $PRS_{i+1}$ and $PRC_{i+1}$ of the next step. At the same time, the quotient digit is converted into the quotient, which does not include "–1" therein, within the quotient production circuit 103, every time when it is obtained.

The quotient production circuit 103 can achieve parallel execution of the single-precision 2 calculations, by adding a selector in a front stage of the computing unit, but without changing the bit width.

Next, the algorithm and the structure of the quotient production circuit, according to the present invention, are shown in FIG. 3 (a) to (c).

FIG. 3 (a) shows an algorithm of the quotient production circuit, which uses a positive value $M_i$ and a negative value $N_i$ therein. The quotient $Q_i$ is the positive value, and the negative value is the positive $-2^{-i}$. The $M_i$ and $N_i$ are obtained sequentially, every time when the quotient digit can be obtained. The positive value $P_i$ at the bit position for calculation is the data, in which only the $i^{th}$ bit position value is "1" and other bits are "0", as is shown by the example, $P_i$ and $P_{i+1}$ in FIG. 3 (b), and it is used to be "$-2^{-i}$". In FIG. 3 (c) is shown the structure of the quotient production circuit for use of the double-precision or the single-precision 1 calculation. A right 1 bit shifter 301 is used for production of "$P_{i+1}=-2^{-i}$". OR circuits 302 and 303 execute the calculations of $M_{i-1}+2^{-i}$ and $N_{i-1}+2^{-i}$, respectively. Within the selectors 304 and 305, $M_i$ and $N_i$ are determined in accordance with the quotient digit $q_i$.

Example of quotient production with using the algorithm within the quotient production circuit will be shown in the following:

$q_0=0, q_1=1, q_2=0, q_3=1, q_4=1$ $Q_1=M_1 0.1, N_1 0.0$ $Q_2=M_2 0.10, N_2 0.01$ $Q_3=M_3 0.101, N_3 0.100$ $Q_4=M_4 0.101, N_3 0.1000$

Namely, putting the quotient digits in that order, i.e., $q_0=0$, $q_1=1$, $q_2=0$, $q_3=1$, $q_4=-1$, and it is assumed that the decimal point leis between the $q_0$ and $q_1$. Since $M_i=Q_i$, and $N_i$ is $M_i-2^{-i}$. Always maintaining $M_i$ and $N_i$ eliminates the necessary of the carry propagation in the production of the quotient. The present theory is also used in the calculation of the partial square root value in the square root extraction, which will be mentioned later. Since the partial square root value is necessary when obtaining the quotient digits, therefore the unnecessary of the carry propagation brings about an effect in an aspect of high-speed calculation of the quotient digits.

Explanation will be given on an example of production of the quotient by using the quotient production circuit, according to the present invention, on the basis of FIG. 4.

Figure 4:
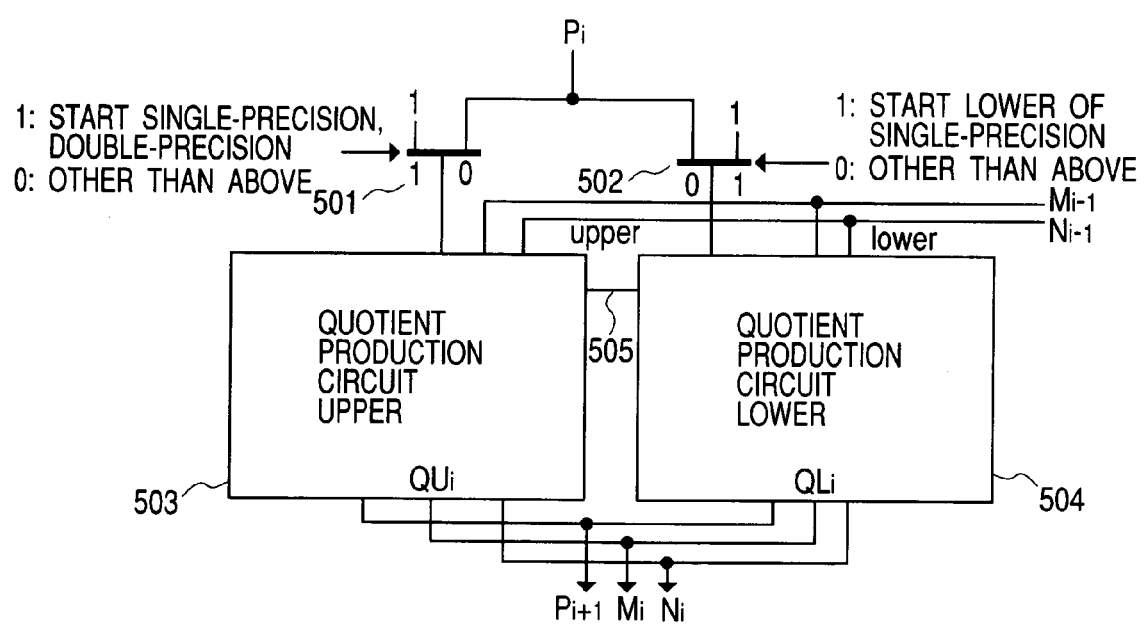
FIG. 4 is a circuit system structure view of the quotient production circuit in the first embodiment, according to the present invention.

FIG. 4 shows the quotient production circuit, which is able to execute the single-precision 2 calculations in parallel. In the position upper side is provided a selector 501 for the time when starting the single-precision and the double-precision and other cases, while in the position lower side a selector 502 for the time when starting the single-precision lower side and other cases, thereby being able to display the bit positions under the calculation for the two (2) calculations at the same time.

Into a quotient selector circuit 503 and a quotient selector circuit 502 are inputted the upper side of "Positive $M_{i-1}$" and the lower side of "Negative $N_{i-1}$", respectively, and an output result is merged. The left shift-out data 505 in the upper side are connected to the quotient selector circuit 504, thereby to be the shift-in data of the right shifter in the lower side. To the quotient selector circuit 504 in the lower side, it is enough to add a selector for selecting "0" and the shift-in data from the upper side for use of the sift-in signal.

As can be understood from the above, with the first embodiment according to the present invention, the calculation can be exchanged among those, such as, the double-precision calculation, the signal-precision calculation, and the single-precision 2 parallel calculations, thereby being executed at high speed.

EMBODIMENT 2

Figure 5:
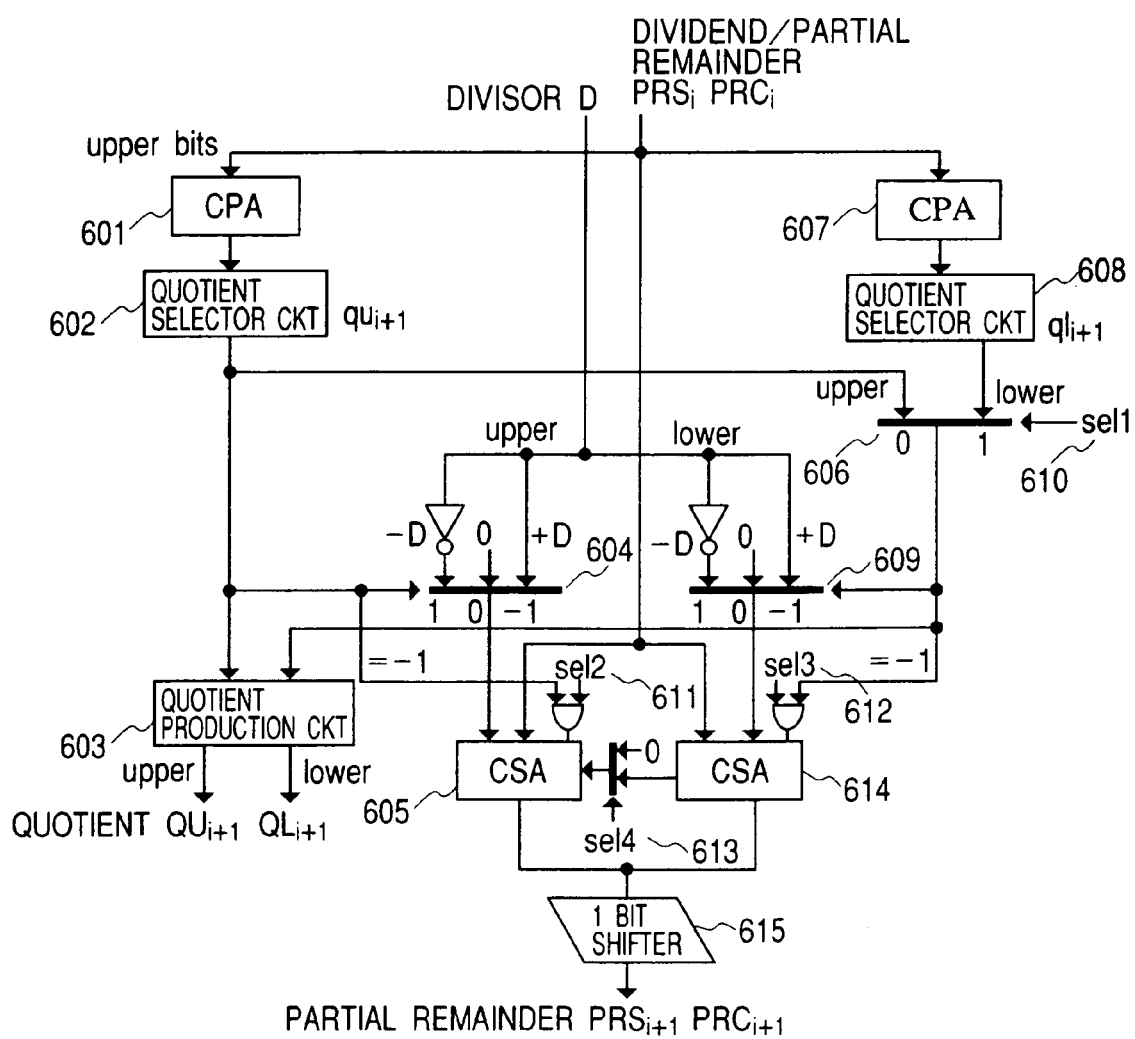
FIG. 5 is a circuit system structure view for explaining a second embodiment, according to the present invention.

Next, explanation will be given on a second embodiment according to the present invention, in which the single-precision divisions are executed in parallel in the upper and the lower within the computing unit of the double-precision bit, by referring to FIG. 5.

The difference from that in the first embodiment lies in an aspect that a data selector 610 inputs the quotient digits, which is an output of the quotient selector circuit. In the first embodiment mentioned above, the input is the partial remainder. The first embodiment and the second embodiment differ from in the selection method of the divisor, due to the difference of the position of the data selectors of the upper side and the lower side.

Namely, in the first embodiment, though the selector signals of the upper side and the lower side divisor selectors 104 and 109 select the divisors depending on the upper side quotient digit $qu_{i+1}$ and the lower side quotient digit $ql_{i+1}$, respectively, however in this second embodiment, both the selector signals of the upper side and the lower side divisor selectors 604 and 609 select the divisors depending on the upper side quotient digit $qu_{i+1}$.

A path of selection of the divisor by means of the quotient digit is a critical path, and therefore the speed in the first embodiment is higher than that in the second embodiment.

Even with the computing unit, not subjected to the SRT, shown in the Japanese Patent Laying-Open No. Hei 4-172526 (1992) mentioned previously, it is possible to construct the high-speed computing unit, through making addition of the new circuits therein and changing the circuits thereof, so that the SRT method can be applied to that circuit, in this manner.

EMBODIMENT 3

Explanation will be given on a third embodiment according to the present invention, which has function of executing the single-precision square root extractions in parallel, at high-speed, by referring to FIG. 6.

The difference from the first embodiment lies in that; those are made up with the partial square root extraction circuits 704 and 709 in the this third embodiment, although they are the divisor selectors 104 and 109 in first embodiment on the contrary thereto. In the square root extraction, in the place of the divisor of the fixed value, the partial square root value is used, which changes sequentially every time when the quotient digit can be obtained.

The carry propagation means CPA 701 and 707, the quotient digit selector circuits 702 and 708, the quotient production circuit 703 for producing the square root value, the carry save adder means CSA 705 and 714, the carry propagation selector 713, and the 1 bit left shifter 715 can be used in common, in the division and the circuit mentioned above, therefore it is suitable to the high integration of an electronic circuit device.

FIG. 7 shows the algorithm of that partial square root circuit. In (1) on the left-hand side in the figure, there is shown the algorithm for the division, for the purpose of comparison, and in (2) at the right-hand side the algorithm for the square root. As apparent from this figure, the square root extraction can be made, in the similar manner to the division mentioned above, by using the partial square root value $M_i+2^{-(i+2)}$ in the place of the divisor D, when the quotient digit is $q_{i+1}=1$, or using the partial square root value $N_i+2^{-(i+1)}+2^{-(i+2)}$ in the place of the divisor D, when the quotient digit is $q_{i+1}=-1$. Where, $M_i$ and $N_i$ are $M_i=Q_i$ and $N_i=Q_i-2^{-1}$.

As the circuit structure, in similar to the quotient production circuit, it is enough to provide the On-the-Fly circuit, which inputs the signals of position $P_i$, Positive $M_{i-1}$ and Negative $M_{i-1}$, and the selector for use of the division or the partial square root value under the quotient digits "−1", "0" and "1", therein.

As apparent from the above, the present invention can be also applied into various high-speed circuits using the SRT method therein.

EMBODIMENT 4

For example, in the Japanese Patent Laying-Open No. Hei 9-68040 (1997) mentioned above, before obtaining the quotient digit result $q_{i+1}$ for the quotient selector circuit at the $(i+1)^{th}$ step, the quotient digit at the $(i+2)^{th}$ step is calculated out for the three (3) cases of the quotient digit $q_{i+1}$, i.e., "−1", "0" and "1" in advance, thereby obtaining the high-speed thereof.

Figure 8:
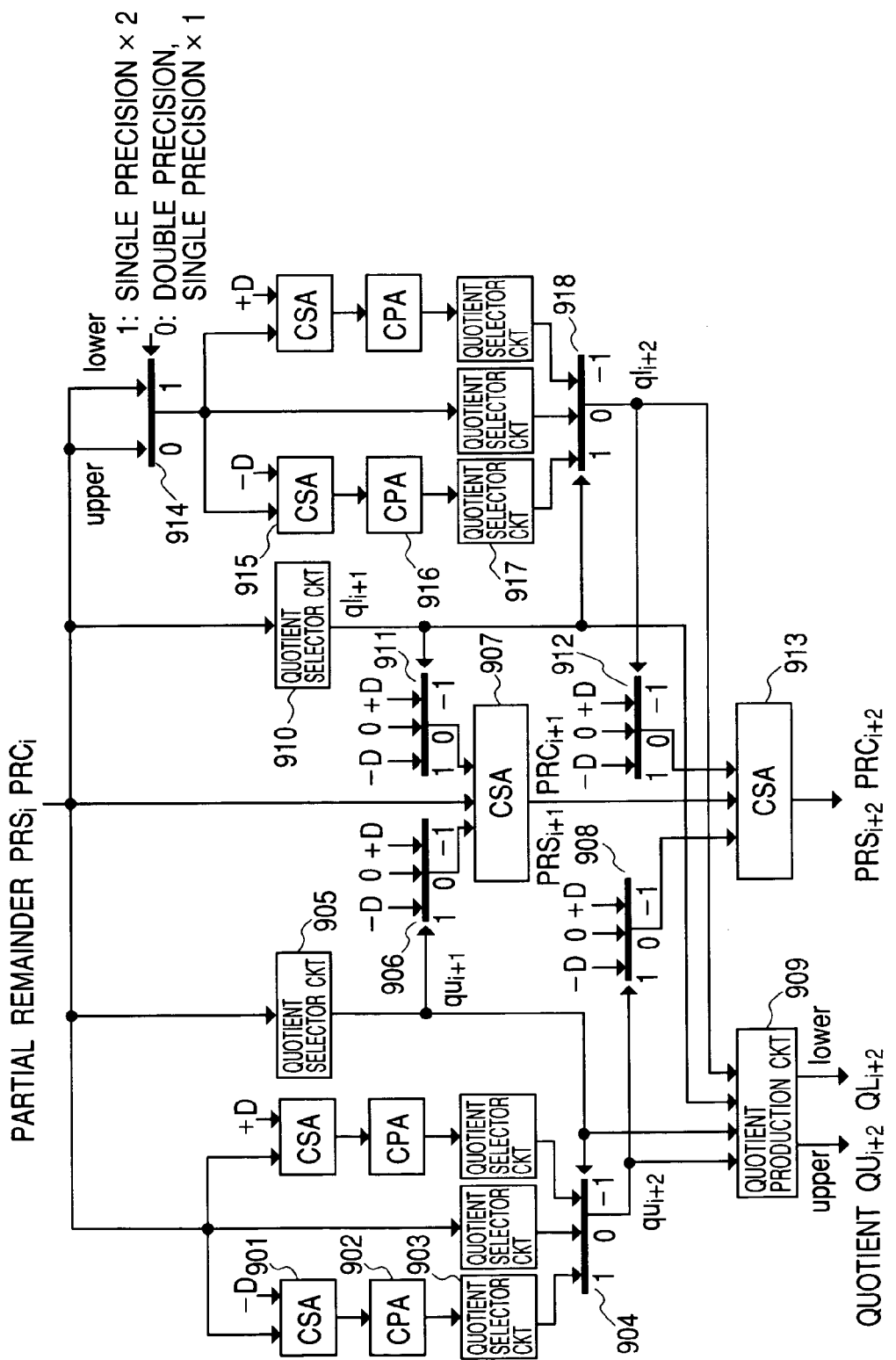
FIG. 8 is a circuit system structure view for explaining a fourth embodiment, according to the present invention.

By referring to FIG. 8, explanation will be given on a forth embodiment, according to the present invention, which is able to execute the single-precision 2 calculations in parallel.

As the circuit structure only for the double-precision or the single-precision 1 calculation, in addition to a carry save adder means CSA 901 for the three (3) cases where the quotient digit $qu_{i+1}$ is "−1", "0" and "1", a carry propagation means CPA 902, and a quotient digit selector circuit 903, it further comprises a quotient digit selector circuit 905, selectors 904 and 906 by means of the quotient digit $qu_{i+1}$, a selector 908 by means of the quotient digit $qu_{i+2}$, a carry save adder means CSA 907 and 913, and a quotient production circuit 909. For enabling the parallel execution of the single-precision 2 calculations, it is enough to provide the following circuits for use of the single-precision lower side, in addition to the circuits mentioned above, newly.

Namely, in addition to a selector 914 for selecting the partial remainder, for the single-precision 2 calculations and the double-precision or the single-precision 1 calculation, a carry save adder means CSA 915 for the three (3) cases where the quotient digit $ql_{i+1}$ is "−1", "0" and "1", a carry propagation means CPA 916, it is enough to add, further, a quotient digit selector circuit 910, selectors 911 and 918 by means of the quotient digit $ql_{i+1}$, and a selector 912 by means of the quotient digit $ql_{i+2}$. The functions of each circuit is similar to that mentioned above, therefore the detailed explanation thereof will be omitted herein.

In each of the carry save adder means CSA 907 and 913 are built in the carry-in theory when the quotient digit is "−1", and a selector for the carry propagation or suppression thereof from the lower side to the upper side, and a 1 bit left shifter.

Figure 6:
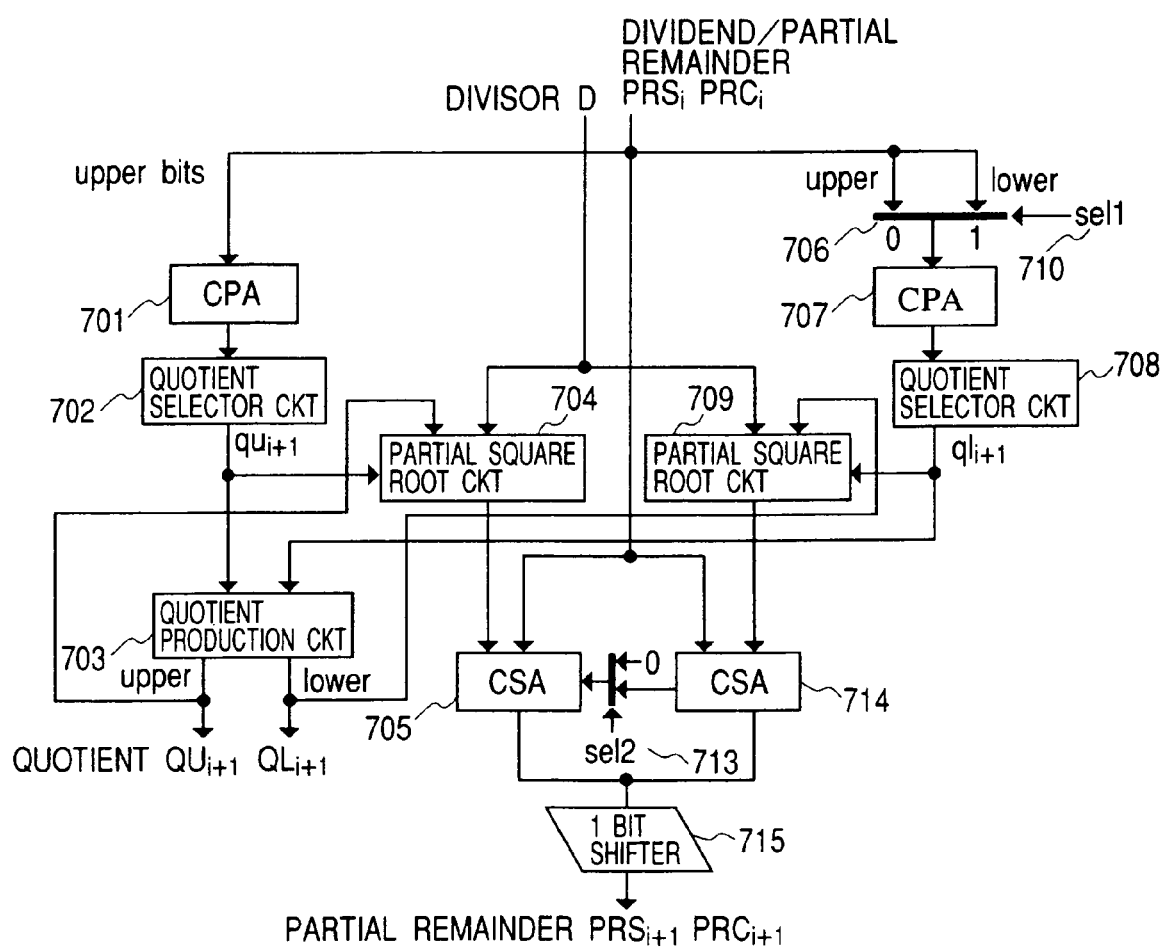
FIG. 6 is a circuit system structure view for explaining a third embodiment, according to the present invention.

And, for the purpose of conducting, not only the division, but also the square root extraction, it can be achieved by replacing the selectors for the division with the partial square root circuits, in the similar manner shown in FIG. 6.

EMBODIMENT 5

Also, in the Japanese Patent Laying-open No. Hei 10-187420 (1998) mentioned above, the partial remainder of the next step is estimated in parallel with the quotient digit selection, thereby obtaining simplification of the circuit of the CPA, and the high-speed thereof, as well. The present invention can be also applied into such the computing unit.

Figure 9:
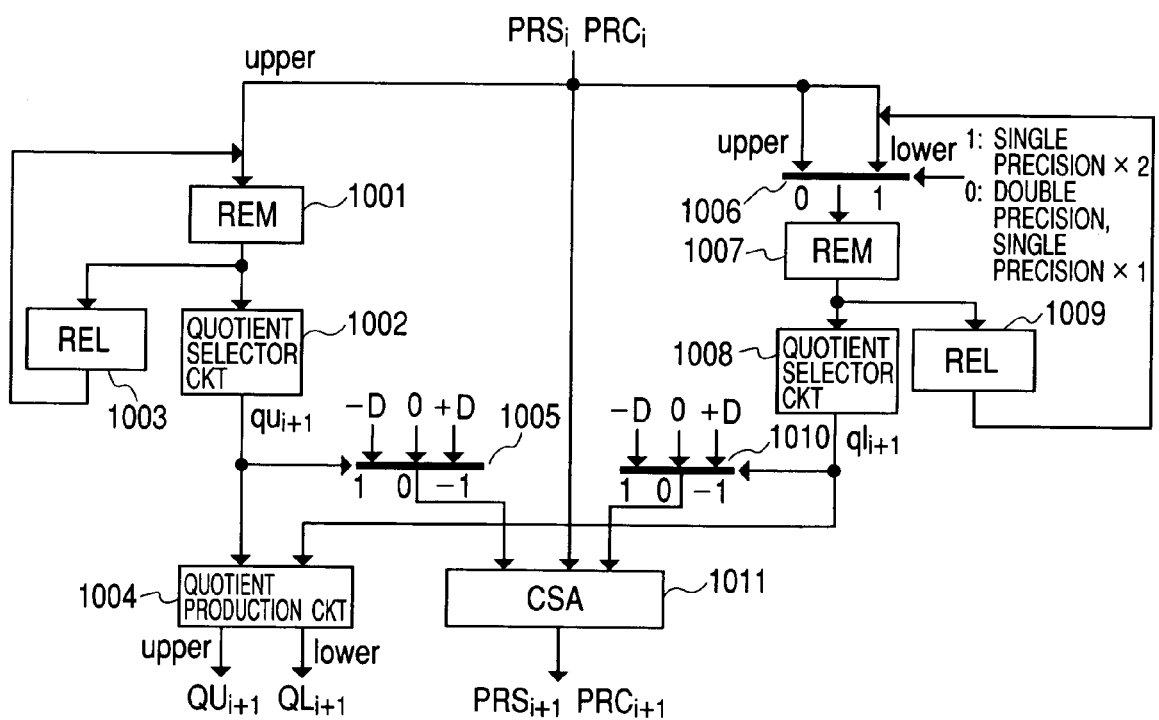
FIG. 9 is a circuit system structure view for explaining a fifth embodiment, according to the present invention.

By referring to FIG. 9, explanation will be made on a fifth embodiment, according to the present invention, in which the present invention is applied into the divider for conducting the partial remainder estimation, thereby enabling the single-precision 2 calculations in parallel.

As the circuit structure only for the double-precision or single-precision 1 calculation, it comprises a partial remainder upper digit determining circuit REM 1001, a quotient digit selector circuit 1002, a partial remainder upper digit estimation circuit REL 1003, a selector 1005 by means of the quotient digit $qu_{i+1}$, a carry save adder means CSA 1011, and a quotient production circuit 1004.

For enabling execution of the single-precision 2 calculations in parallel, it is enough to provide the following circuits for use of the single-precision lower side of the circuit mentioned above, newly. Thus, they include a selector 1006 for selecting the partial remainder for the single-precision 2 calculations and the double-precision or the single-precision 1 calculation, a partial remainder upper digit determining circuit REM 1007, a quotient selector circuit 1008, a partial remainder upper digit estimation circuit REL, and a selector by means of the quotient digit $ql_{i+1}$.

Though explanation of the function of each circuit is omitted since being similar to the circuit shown in the first embodiment, in the carry save adder means CSA 1011 are built in the carry-in theory when the quotient digit is "−1", a selector for suppressing the carry propagation or suppression thereof from the lower side to the upper side, and a 1 bit left shifter.

And, for the purpose of conducting, not only the division, but also the square root extraction, it can be achieved by replacing the selectors for the division with the partial square root circuits, in the similar manner shown in FIG. 6.

EMBODIMENT 6

Further, an example is shown, in which can be obtained the quotient digit of 2 bits, in the fourth embodiment, and others in which can be obtained the quotient digit of 1 bit, in other embodiments, according to the present invention, it is possible to expand those, so as to obtain the quotient digit of several bits.

For example, assuming that the circuit for obtaining the quotient digit of 1 bit, shown in the first embodiment, by a circuit of 1 stage, it is possible to obtain the quotient digit of 3 bits, by connecting the circuits of 1 stage, for three (3) stages thereof, sequentially. Though omitting the detailed explanation thereof, it can be construct in the similar manner with respect to the other embodiments.

EMBODIMENT 7

Though being shown the examples, in which two (2) calculations of the single-precision are executed through the computing unit of double-precision width, in the various embodiments mentioned in the above, however the bit width should not be restricted only to the double-precision. If the bit width is made large, then it is possible to increase the number of calculations of the single-precision, which can be executed in parallel. And, the present invention can be applied, not only into a synchronizing circuit, but also into an a synchronizing circuit, and thereby it is possible to achieve various electronic circuit devices of high-speed.

Figure 10:
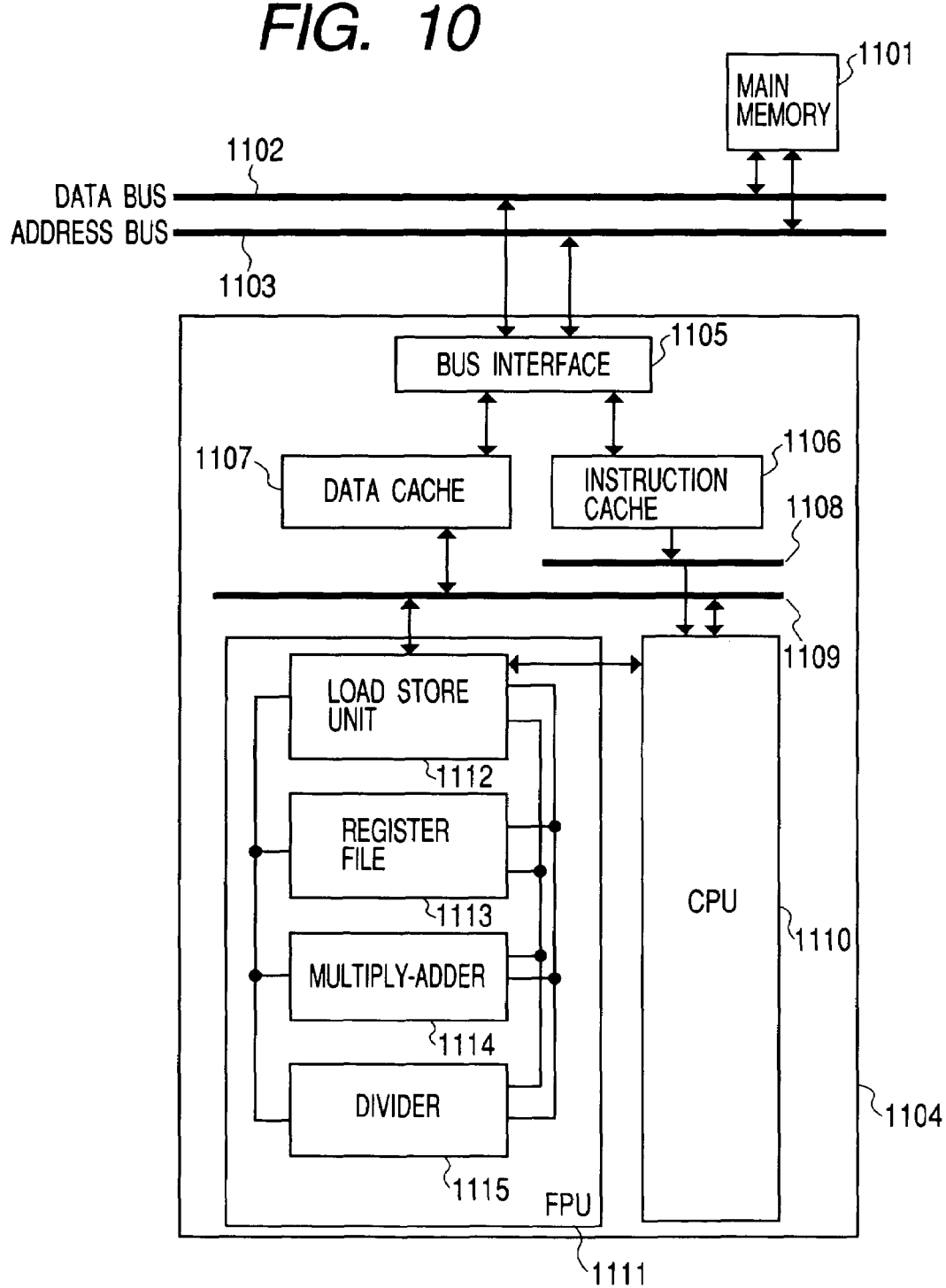
FIG. 10 is a circuit system structure view for explaining a sixth embodiment of an electronic circuit device, in which a floating point SRT dividing unit is installed, according to the present invention.

By referring to FIG. 10, the structure of a microprocessor will be shown, in which a floating point divider (or the square root extractor), as a seventh embodiment according to the present invention.

A main memory 1101, such as, DRAM, SDRAM, etc., for example, is connected to a microprocessor 1104 through an outer data bus 1002 and an outer address bus 103. The microprocessor 1104 is built up with, a bus interface unit 1105 for performing transmission of data between an outside, an instruction cache 1106, a data cache 1107, an address bus 1108 for carrying an instruction or command code from the instruction cache 1106, a data bus 1109 for conducting read-out and write-in of data from/into the data cache 1107, a CPU 1110, and a FPU (Floating Point Unit) 1111. However, the main memory 1101, such as DRAM, SDRAM, etc., is not provided in an outside, but it may be built in together with the microprocessor 1104, within a piece of a semiconductor substrate. In this instance, the buses 1102 and 1103 are constructed with internal buses on the same chip.

The FPU 1111 installs therein a floating point divider (or a floating point square root unit) 1115, which is able to execute the double-precision calculation, the single-precision calculation and the parallel calculations of plural single-precision, in plural operation modes, and other than those, it further comprises a floating point load store unit 1112 for conducting load and store of data to the data bus 1109, a floating point register file 1113, and a floating point multiply-adder 1114, etc.

However, for an exponent calculating portion of the floating-point divider, a carry propagation portion of the partial remainder, which is outputted in the forms "sum", "carry" or the carry save form, a normalizing process portion, a rounding process portion, and a detection portion of exception, such as, zero division, etc., there is necessity of other theories. In FIG. 10, it is assumed that the theories mentioned above lies within the floating-point point multiply-adder 1114.

However, with such the electronic circuit device, it is necessary to be constructed, so that a user can designate the operation mode of the computing unit mentioned above, form an outside, at random.

Next, upon the basis of FIG. 11, explanation will be made about the floating-point register file 1113, which is necessary, in particular, for operating the microprocessor according to the present invention, shown in FIG. 10. Herein, explanation will be given, in particular, on an example of the command code for designating the simultaneous execution of the single-precision 2 calculations, which is stored in a FPU status register therein.

Figure 11:
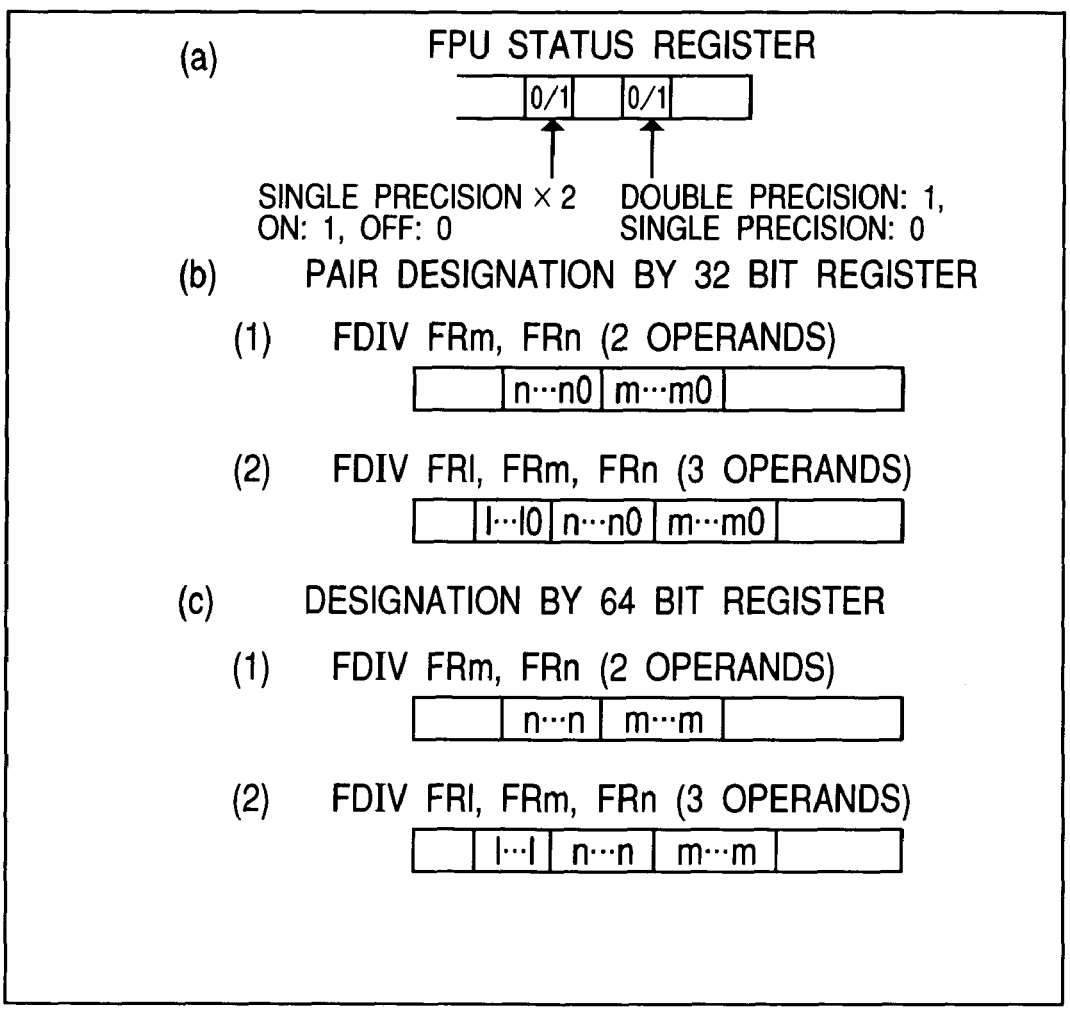
FIG. 11 is the structure view of command codes within a register, for explaining the command codes for use in the floating point SRT division in a seventh embodiment, according to the present invention.

As be seen from FIG. 11 (a), in the floating point status register, there are provided a mode bit (0/1) for turning ON or OFF the parallel execution of the single-precision 2 calculations, and a mode bit (0/1) for the double-precision or the single-precision, thereby being constructed so that the user can made control or select actively from an outside through software. However, it is inhibited that the modes for the single-precision 2 calculations and the double-precision are set to ON (1) at the same time.

Also, as the method more detailed, on designation of this FPU status register, there are two methods; i.e., a method of designating the continuous 32 bits registers in a pair, as shown by an example in FIG. 11 (b); and a method of designating a 64 bits register, as shown by an example in FIG. 11 (c). In each of the designation methods shown in FIGS. 11 (b) and (c), there are shown (1) a two-operand method of designating "FDIV $FR_m$" and "$FR_n$", and (2) a three-operand method of designating "FDIV $FR_l$", "$FR_m$", "$FR_n$". In the case of designating this register in a pair, for example, $FR_n$ and $FR_{n+1}$ registers are designated to the $FR_n$.

With doing so, according to the present invention, it is possible for the user to set the operation process mode; such as, execution of the single-precision 1 calculation in the division or the square root unit of the floating point, parallel execution of the single-precision 2 calculations, execution of the double-precision calculation, execution of the square root unit, etc., at random corresponding to the purpose of use, easily.

Moreover, as was mentioned in the above, those plural numbers of modes can be achieved by the circuit structure being almost same, therefore it is possible to achieve a large-scaled semiconductor integrated-circuit (LSI), integrating the high-performance electronic circuit device within one piece of the semiconductor substrate, by building up the computing unit enabling the high-speed operation therein.

INDUSTRIAL APPLICABILITY

In a SRT divider and a square root unit of floating point double-precision bit width, with provision of a selector of single-precision and double-precision, a carry propagation means CPA for conducting carry propagation of a partial remainder, a quotient digit selector circuit for making selection on a quotient digit, and a selector of a divisor or a partial square root extractor circuit, in a lower side thereof, while providing a selector for selecting the propagation of carry between a carry save adder means CSA in the upper side and the lower side thereof, and a selector of a starting position within a quotient production circuit, thereby enabling to execute two (2) calculations, such as, division or square root unit of the floating point single-precision, at the same time, but without increasing the bit width of the computing unit. Also, in the case where the double-precision is selected by the selector, the same input is provided into the quotient digit selectors, so as to increase the driving power of the quotient digit selected as two (2) time large as it is, thereby obtaining the high-speed of the circuit, even upon the double-precision calculation.

Also, with instillation of the divider and/or the square root extractor, in which the present invention is applied to, into electronic equipments or appliances, such as, the microprocessor, etc., it is possible to obtain electronic appliances or appliances having high-speed and high-performances.

The invention claimed is:

1. A computing unit, comprising:
    an input portion, into which a dividend or a partial remainder thereof and a divisor are input;
    a selector for selection between an upper side and a lower side of said dividend or the partial remainder thereof;
    a carry propagation means for propagating carry on said dividend of the upper side and/or the lower side selected or the partial remainder portion;
    a quotient digit selection means for inputting an output of said carry propagation means;
    a quotient production means, inputting said quotient digit, and for producing a quotient;
    a carry save adder means for conducting addition or subtraction between said dividend or the partial remainder thereof and said divisor, depending upon a value of the quotient digit obtained by said quotient digit selector means; and a carry propagation selector means for selecting propagation or non-propagation of carry from the lower side to the upper side, wherein an output of said carry save adder means is input into said input portion to be a new dividend or a partial remainder thereof, again, by conducting a predetermined bit shift thereon.

2. A computing unit for extracting a square root value of a dividend, comprising:

an input portion, into which said dividend or a partial remainder thereof is input;

a selector for selection between an upper side and a lower side of said dividend or the partial remainder thereof;

a carry propagation means for propagating carry on said dividend of the upper side and/or the lower side selected;

a quotient digit selection means for inputting an output of said carry propagation means;

a quotient production means, inputting said quotient digit, and for producing a square root value;

a carry save adder means for conducting addition or subtraction between said dividend or said partial square root value and said divisor, depending upon a value of the quotient digit obtained by said quotient digit selector means, and carry saving a result thereof; and a carry propagation selector means for selecting propagation or non-propagation of carry from the lower side to the upper side, wherein an output of said carry save adder means is input into said input portion to be a new dividend or a partial remainder thereof, again, by conducting a predetermined bit shift thereon, and wherein repeating a series of the operations, thereby calculating the square root value of said dividend.

3. A computing unit, inputting a dividend or a partial remainder thereof and a divisor into an input portion, conducting carry propagation on said dividend or the partial reminder by a first carry propagation means, inputting an output of said first carry propagation means into a first quotient digit selector circuit, thereby obtaining a first quotient digit, adding or subtracting said dividend or the partial remainder thereof and said divisor by a first carry save adder means, shifting a result of said adding or subtracting by a predetermined bits through a shifter, so as to input into said input portion as a new dividend or a new remainder, again, and repeating a series of those operations, wherein a first quotient is calculated out by said quotient production means while inputting said first quotient digit therein, said computing unit comprising:

a selector for selecting an upper portion or a lower portion of said dividend or said partial remainder, in parallel with said input portion;

a second carry propagation means for propagating carry of said dividend or said partial remainder selected;

a second quotient digit selector circuit, receiving an output of said second carry propagation means, for outputting a second quotient digit;

a second carry save adder means for conducting adding or subtracting between said dividend or said partial remainder selected and said divisor depending upon a value of said second quotient digit;

means, inputting said second quotient digit, for calculating out a second quotient by means of said quotient production means, and for selecting the carry propagation between said first carry save adder means and said second carry save adder means, wherein said result added/subtracted by said second carry save adder means is shifted by said predetermined bits, by means of said shifter, while being merged with said addition or subtraction result by means of said first carry save adder means, thereby inputting said shift result merged into said input portion.

4. An electronic circuit device, installing therein a computing unit according to any of claims 1 to 3.

5. A square root unit, inputting a dividend or a partial reminder thereof into an input portion, conducting carry propagation on said dividend or the partial reminder by a first carry propagation means, inputting an output of said first carry propagation means into a first quotient digit selector circuit, thereby obtaining a first quotient digit, producing a first square root value by a quotient production means for inputting said quotient digit, producing a partial square root value by a partial square root value production means for inputting said quotient digit, producing a first partial square root value by a quotient production means connected to an output portion of said first carry propagation means, conducting addition or subtraction between said dividend or said partial remainder and said divisor or said first partial square root value by a first carry save adder means, depending upon a value of said first quotient digit, shifting a result of said addition or subtraction by a predetermined bits through a shifter, so as to input into said input portion, as a new dividend or a new partial remainder, again, and repeating a series of those operations, wherein the square root value of the dividend is calculated out by said quotient production means, said square root unit comprising:

a selector for selecting an upper portion or a lower portion of said dividend or said partial remainder, in parallel with said input portion;

a second carry propagation means for conducting carry propagation of said dividend or said partial remainder selected; and a second quotient digit selector circuit, receiving an output of said second carry propagation means, for outputting a second quotient digit, wherein said quotient production means produces a second square root value by a quotient production means for inputting said second quotient digit, and a second partial square root value is produced by a partial square root value production means for inputting said second quotient digit, and further comprising:

a second carry save adder means for conducting addition or subtraction between said dividend or said partial remainder selected and said divisor or said second portion square root value, depending upon a value of said second quotient digit of said second quotient digit selector circuit; and means for selecting carry propagation between said first carry save adder means and said second carry save adder means, wherein said result added or subtracted by said second carry save adder means is shifted by said predetermined bits, by means of said shifter, while being merged with said addition or subtraction result by means of said first carry save adder means, thereby inputting said shift result merged into said input portion.

6. An electronic device, installing therein a square root unit according to claim 5.

* * * * *